Aug. 20, 1963  R. REQUA  3,101,217
RESILIENT CUSHION UNIT
Filed Nov. 30, 1961
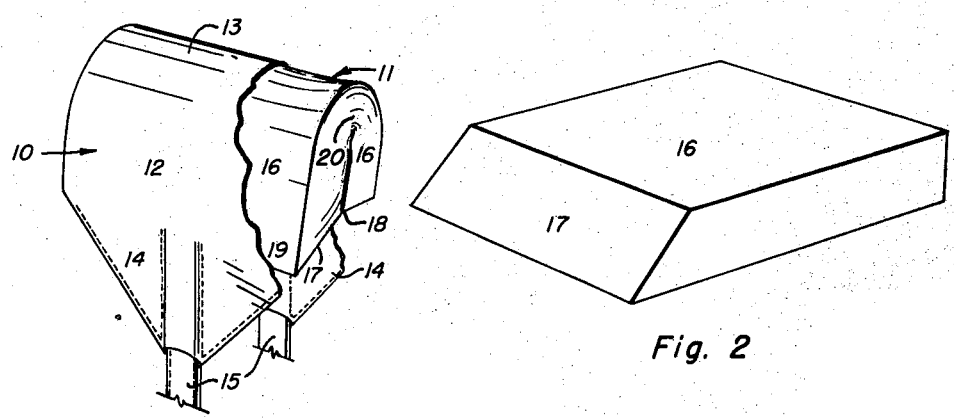
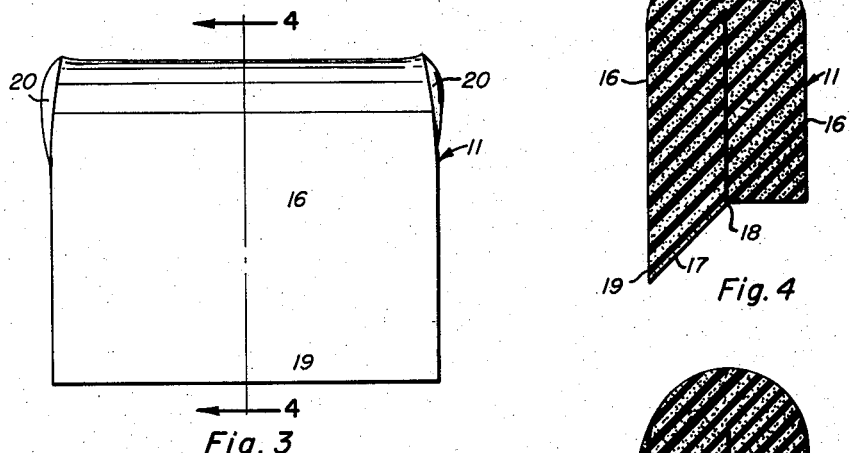
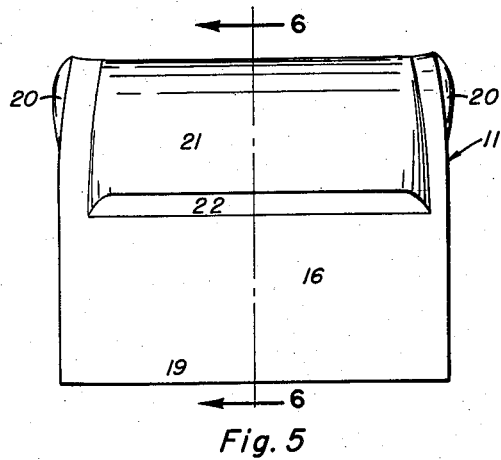
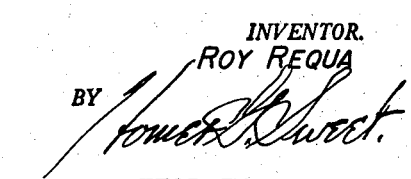
INVENTOR.
ROY REQUA
BY
ATTORNEY

United States Patent Office 3,101,217
Patented Aug. 20, 1963

3,101,217
RESILIENT CUSHION UNIT
Roy Requa, 5801 Federal Blvd., Denver, Colo.
Filed Nov. 30, 1961, Ser. No. 156,099
4 Claims. (Cl. 297—397)

This invention relates to cushion units, variously termed fillers, inserts, bolsters, blocks, buns, and pads, engageable within and to distend a confining cover thereby conditioned to function as a cushion, and more particularly to such units adapted in form and construction for use in association with a suitable cover as a headrest detachably and adjustably coactable with and as an upward extension from the back sections of conventional automobile seats, and the like, such, for example, as is disclosed in my pending application for Letters Patent of the United States filed on May 31, 1960, Serial No. 32,938, now Patent No. 3,043,626, and has as an object to provide a novel and improved resilient cushion unit of high practicality and advantageous properties.

A further object of the invention is to provide a novel and improved resilient cushion unit complement for a headrest cushion that is uniquely simple and economical of production from readily-available materials.

A further object of the invention is to provide a novel and improved resilient cushion unit complement for a headrest cushion that is characterized by an advantageous distribution of varying resilient reactions.

A further object of the invention is to provide a novel and improved resilient cushion unit complement for a headrest cushion that is highly resistant to permanent distortion during prolonged use.

A further object of the invention is to provide a novel and improved method of forming a resilient cushion unit complement for a headrest cushion.

A further object of the invention is to provide a novel and improved resilient cushion unit complement for a headrest cushion that is comfortably conformable to the needs and preferences of a user, reliable as a source of desired ease-promoting and hazard-minimizing support, amenable to production in diverse appropriate sizes, inert as a health menace, easy to clean, light in weight, and positive and efficient in attainment of the ends for which designed. With the foregoing and other objects in view, my invention consists in the construction, arrangement, and operative combination of elements as hereinafter set forth, pointed out in the appended claims, and illustrated by the accompanying drawing, in which—

FIGURE 1 is a perspective view of a typical headrest cushion organization as conditioned for intended use by means of the resilient cushion unit feature of the present invention, a portion of the cover component of the typical assembly being broken away to reveal otherwise concealed relationships.

FIGURE 2 is an isometric view of the blank primary to production of the resilient cushion unit shown in FIGURE 1.

FIGURE 3 is a front face elevational view, on a relatively-enlarged scale, of the resilient cushion unit of the invention apart from the cover component wherewith it is employable.

FIGURE 4 is a transverse section through and substantially on the indicated line 4—4 of FIGURE 3.

FIGURE 5 is an elevational view similar to FIGURE 3 exemplifying a supplemented variation of the latter within the contemplation of the invention.

FIGURE 6 is a transverse section through and substantially on the indicated line 6—6 of FIGURE 5.

Occasion for and the advantages of headrest cushions adapted to upstand in detachable and adjustable relation from the back sections of conventional automobile seats are recognized beyond warrant for further elaboration. One such headrest cushion characterized by high practicality, convenience, and facility of use is shown and described in my pending patent application above noted as comprised from an envelope, or cover, of flexible material formed to a pouch adapted to confine, and to be distended by, a filler block of resilient material conformable to the interior of the cover in an association therewith effective to expose a side area of the filler block through the open mouth of the cover pouch in an arrangement effective to apply such exposed side area of the block to and in frictional engagement against the upper margin of a seat back section supporting the headrest cushion in use position thereon. Technical and economic complications attending conventional production of the shaped, resilient filler block represented in application Serial No. 32,938, together with functionally-inferior development and correlation of varying resilient properties therein, establish as desirable a distinctive construction for a novel method of contriving the resilient unit component of the headrest cushion practicable to obviate the inadequacies just discussed, and the instant invention is hence directed to the provision of a novel and improved resilient cushion unit component for a headrest cushion of enhanced functional merit and a simple and practical method of producing the same.

Typifying the use environment of the present invention, FIGURE 1 shows the general headrest cushion organization disclosed in my earlier application as comprised from a flexible envelope, or cover, 10 expediently identical with that shown and described in said earlier application and a resilient unit 11 conformed in analogy with the resilient block component of my previous disclosure to realize and give effect to the principles of the instant invention received within and distending the envelope. Suitably formed in any feasible manner from flexible sheet material, the envelope 10 is a pouch defined by spacedly-parallel side walls 12 continued oppositely from an exteriorly-convex web 13 closing one side of the pouch, transverse end closures, not shown, and skirts 14 extending from the long sides of the side walls 12 in coaction with attaching elements 15 arranged to secure the pouch in enveloping relation with a resilient block, or unit, to a seat back section with the open side of the pouch between the skirts 14, and the area of the block, or unit, exposed therethrough closed in opposition to and against the upwardly-directed margin of the section. As so constituted, the resilient component of the headrest cushion is engaged within and to distend the envelope, or cover, free from attachment to the latter, and hence may be removed and replaced at will.

Applicable to practical and advantageous use as the resilient filler component of the headrest cushion, the resilient cushion unit of the instant invention is distinctively contrived in accordance with and to give effect to the principles of the invention in a size and proportion of dimensions suited for reception within and distention of the pouch characterizing the envelope, or cover, 10 designed for association therewith.

Economically featuring and simplifying production of the resilient cushion unit of the invention is the development thereof from a flat, rectangular blank 16 cut to desired size and form from commercially-available suitable sheet material. The resilient properties of the ultimate cushion unit derive from the similar properties of the material utilized for the blank 16, there being, as is common knowledge, several homogeneous, pliable, and resilient materials, such as natural and synthetic rubber sponges, latex foams, and synthetic foams, readily to be had in sheets and slabs of varying size and thickness. While it is within the contemplation of the invention that any and all of the known materials having the requisite properties of resilience, pliability, and homogeneity may be availed of for production of the cushion unit of the invention, each of the known such materials has certain specific characteristics, and certain variations of degree as to its properties, which qualify some thereof as better suited for practice of the present invention than others. Experience has established that the commercial product known as polyether foam is eminently satisfactory, in every respect, to effectuate the purposes and realize the advantages of the invention and the ready availability of such material at nominal cost in appropriate stock sizes enhances its suitability.

From a sheet or slab of the selected, appropriate material obtained in a stock thickness approximately one-half the thickness desired for the completed resilient cushion unit there is cut for each ultimate such unit a blank 16 characterized by plane, parallel, rectangular face areas of like width equal to the length of the cushion unit to be formed intercepted between spacedly-parallel, plane side margins perpendicular thereto through the thickness of the original material and determined as to length at one end by a plane perpendicular thereto through the thickness of the material and normal to said side margins. The wide, rectangular face areas of the blank thus correspondingly registered at one end are unequal in lengths established by an inclined terminal plane 17 transversely thereof and perpendicular to the side margins of the blank at an angle through the thickness of the material effective to establish for the wide face area acutely angular with respect to the plane 17 a length approximating the transverse interior extent of the sides 12 and connecting web 13 of the envelope, or cover 11, wherewith the unit is to associate, and to establish for the complementary wide face area obtusely angular with respect to said plane 17 a length relatively less than that of the longer face area by an amount approximating the thickness of the material. As will be obvious, the blanks 16 for cushions of corresponding size are adapted by virtue of regularity of outline to be cut from stock material with a minimum of waste.

From a single blank 16, the resilient cushion unit of the invention is completed very simply and expeditiously through the operations of first coating the shorter of the wide face areas of the blank with a suitable adhesive having bonding affinity for the material of the blank, such adhesives being well known and widely available, and then folding the blank on a transverse line bisecting the coated face area to double the latter upon itself with its opposite end margin in registration, whereby to close the coated half portions of the double area together as a bond 18 securing and retaining the blank in the form of a cushion, or bolster, sized for snug reception within the envelope, or cover, 10 whereto it is adapted, in which folded condition the blank 16 is compressed and retained until the adhesive of the bond 18 has set to reliably resist the tendency of the blank to unfold. As is clearly shown by FIGURE 4, there results from the folding and adhesive bonding of the blank 16 accomplished as above set forth a unit having one convex long side margin conformably engageable interiorly against the web 13 of the envelope, or cover, and an opposite long side margin whereof a longitudinal half portion is flat in a plane perpendicular to the exterior side faces of the unit and the complementary longitudinal half portion is the plane 17 inclined downwardly and outwardly from the transverse center of the unit as a tapered lip extension 19, whereby the said unit is adapted for mounted engagement with the upper margin of a seat back section with the lip extension 19 directed forwardly of the seat over and against compressible zones of the seat structure and the flat area contiguous to conjunction with the lip extension juxtaposed to firmer zones of said structure. Incident to the folding of the blank 16 as set forth, stresses occasioned within the material of the blank are productive of slight bulging of the material evident as protuberant bosses 20 interrupting the end area planes of the unit where intersected by the line of the fold, which bosses, and the attendant retraction of circumjacent arcuate corners of the unit, enhance the convenience of unit insertion within the envelope, or cover, 10 and promote sightly appearance of the resulting headrest assembly.

Significant to the functional merit of the improved resilient cushion unit in the practical use association above set forth are the diverse degrees of resilience, and the distribution and correlation thereof, distinctively characterizing the unit as a consequence of its unique formation. Doubled upon itself and so held by the adhesive bond 18, the material of the blank 16 is stressed to variation of its original uniform resilience in the region of the fold which results from, and reflects, the compression and compaction of the material at and about the fold line at the inner end of the bond 18 and the stretching and extension of the material constituting the convex margin of the unit naturally attending the folding operation. In supplementing coaction, the interior compression and the exterior extension of the blank material occasioned by the fold firms and moderately stiffens the convex margin portion of the unit to a yieldable resistance somewhat greater than that of the unstressed material and hence serves, with maintained adequate cushioning effect, to accommodate imposed loads with but functionally-tolerable deformation of the free marginal portion of the cushion principally subject to distortion. Further contributing to the functional merit of the resilient cushion unit of the invention is the bond 18 medially and longitudinally of the unit from the fold line therein and to the margin thereof remote from the fold, which bond serves, after the adhesive from whch it is constituted has set, as a web having a pliability less than that of the material it unites disposed to yieldably reinforce the cushion unit in resistance to forces tending to alter the unit dimensions parallel to the bond or to flex the latter, while in no way impairing the cushioning properties of the material wherebetween the bond is effective. Thus, the presence of the bond and the stresses resulting from the fold determine distinguishing variations and correlations of resilient properties of advantageous practical effect hitherto lacking in the known analogous cushion units of the pertinent art.

When, as, and to the extent desired, the surface of the cushion unit exposed between the convex margin and the lip extension 19 thereof which is adapted in the use position of the cushion to receive the impress of the user may be contoured for preferred support effect with respect to the user, it being eminently feasible to adhere overlays of resilient material expediently the same as utilized for the blank 16 to such surface in any arrangement of overlay size, shape, and disposition deemed to be appropriate. Typifying the modification of cushion unit surface conformation just discussed, FIGURES 5 and 6 represent the resilient cushion unit generic to the invention as supplemented by an overlay 21 generally rectangular in outline and tapered in thickness from a bevelled long margin 22 to a featheredge at the opposite long margin, which overlay, in a length less than that of the cushion unit to which it is applied and a width less than its length is affixed to the unit by means of an adhesive bond 23 with its featheredge overlapped slightly on and along the convex margin of the unit and its bevelled margin 22 spacedly parallel to the lip extension 19 of the unit, in which association the overlay 21 serves as a pad outstanding as a conformation feature from the unit with slight bulging effect upon the associated cover 10 to provide shaped support for the user of the headrest cushion.

Eliminating the need for moulds, special equipment, and expensive facilities, the simple, economical, and practical method of forming a resilient cushion unit in accordance with the principles of the invention consists of cutting a rectangular blank terminating in one inclined end from a sheet or slab of appropriate resilient material, coating the lesser wide face of the blank with suitable adhesive, folding the blank on the transverse median line of the coated face to coaction of the coated half areas thereof, and maintaining interengagement of the contacting coated half areas until the adhesive has set.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A resilient cushion unit comprising an initially-flat, substantially-rectangular member of homogeneous, pliable and resilient material having a thickness approximately half that of the unit between parallel major surface areas of like width approximating the length of said unit, said major surface areas being coterminous at one end of the member and of unequal lengths determined by an inclined plane through the thickness and at the other end of the member, a fold at the transverse median line of the shorter of the major surface areas effective to contactingly register the half portions thereof, and an adhesive bond uniting the confronting surface area half portions.

2. A resilient cushion unit comprising an initially-flat, substantially-rectangular member of thick, homogeneous, pliable and resilient material symmetrically folded upon itself at the transverse median line of one major surface area thereof to contactingly register the half portions of said area, an adhesive bond uniting the confronting surface area half portions, and an overlay of homogeneous, pliable and resilient material adhesively bonded to the exterior surface of the unit as a protrusion therefrom contiguous to the surface convexity resulting from the fold.

3. A resilient cushion unit comprising an initially-flat, substantially-rectangular member of homogeneous, pliable and resilient material having a thickness approximating half that of the unit between parallel major surface areas of like width approximating the length of said unit, said member being folded upon itself at the transverse median line of one said major surface area to contactingly register the half portions thereof, an adhesive bond uniting the confronting surface area half portions, and an overlay of homogeneous, pliable and resilient material adhesively bonded in a length approaching that of the unit to the exterior surface of the latter as a protrusion therefrom contiguous to the surface convexity resulting from the fold.

4. A resilient cushion unit comprising an initially-flat, substantially-rectangular member of homogeneous, pliable and resilient material having a thickness approximating half that of the unit between parallel major surface areas of like width approximating the length of said unit, said major surface areas being coterminous at one end of the member and of unequal lengths determined by an inclined plane through the thickness and at the other end of the member, a fold at the transverse median line of the shorter of the major surface areas effective to contactingly register the half portions thereof, an adhesive bond uniting the confronting surface area half portions, and an overlay of homogeneous, pliable, and resilient material adhesively bonded in a length approaching that of the unit to the exterior surface of the latter terminating at said inclined plane as a protrusion contiguous to the surface convexity resulting from the fold.

References Cited in the file of this patent

UNITED STATES PATENTS

| | | |
|---|---|---|
| 2,266,459 | Gilbert | Dec. 16, 1941 |
| 2,589,013 | Martin | Mar. 11, 1952 |
| 2,720,660 | Smith | Oct. 18, 1955 |
| 2,837,145 | Goetz | June 3, 1958 |
| 2,867,266 | Vogler | Jan. 6, 1959 |
| 2,892,489 | Hurley | June 30, 1959 |

FOREIGN PATENTS

| | | |
|---|---|---|
| 507,161 | Great Britain | June 9, 1939 |